C. S. ALLEN.
DIRECT DRIVE FRICTION TRANSMISSION.
APPLICATION FILED MAR. 9, 1915.
1,177,468.
Patented Mar. 28, 1916.
3 SHEETS—SHEET 2.
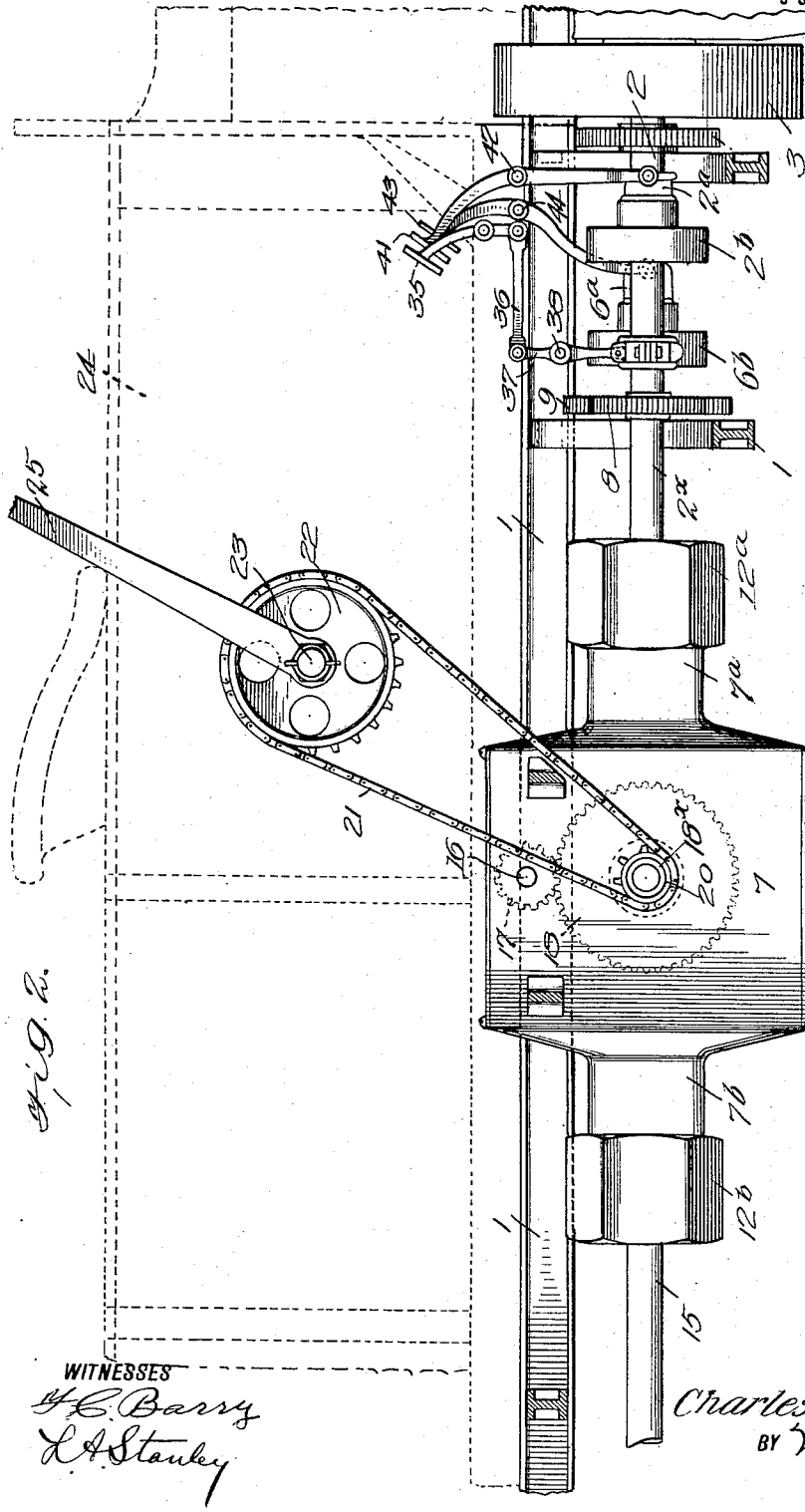
WITNESSES
INVENTOR
Charles S. Allen
BY
ATTORNEYS C. S. ALLEN.
DIRECT DRIVE FRICTION TRANSMISSION.
APPLICATION FILED MAR. 9, 1915.
1,177,468.
Patented Mar. 28, 1916.
3 SHEETS—SHEET 3.
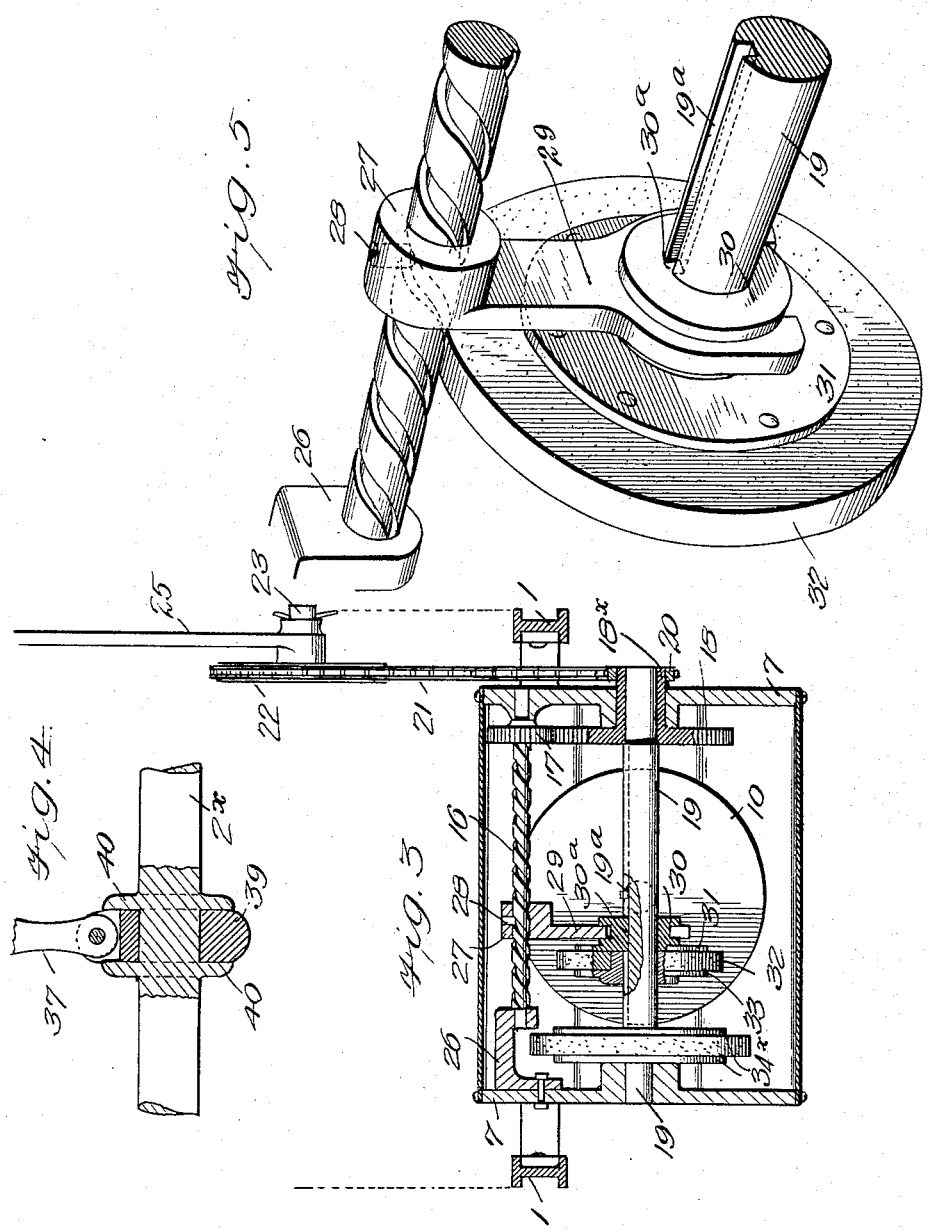
WITNESSES
INVENTOR
Charles S. Allen
BY
ATTORNEYS

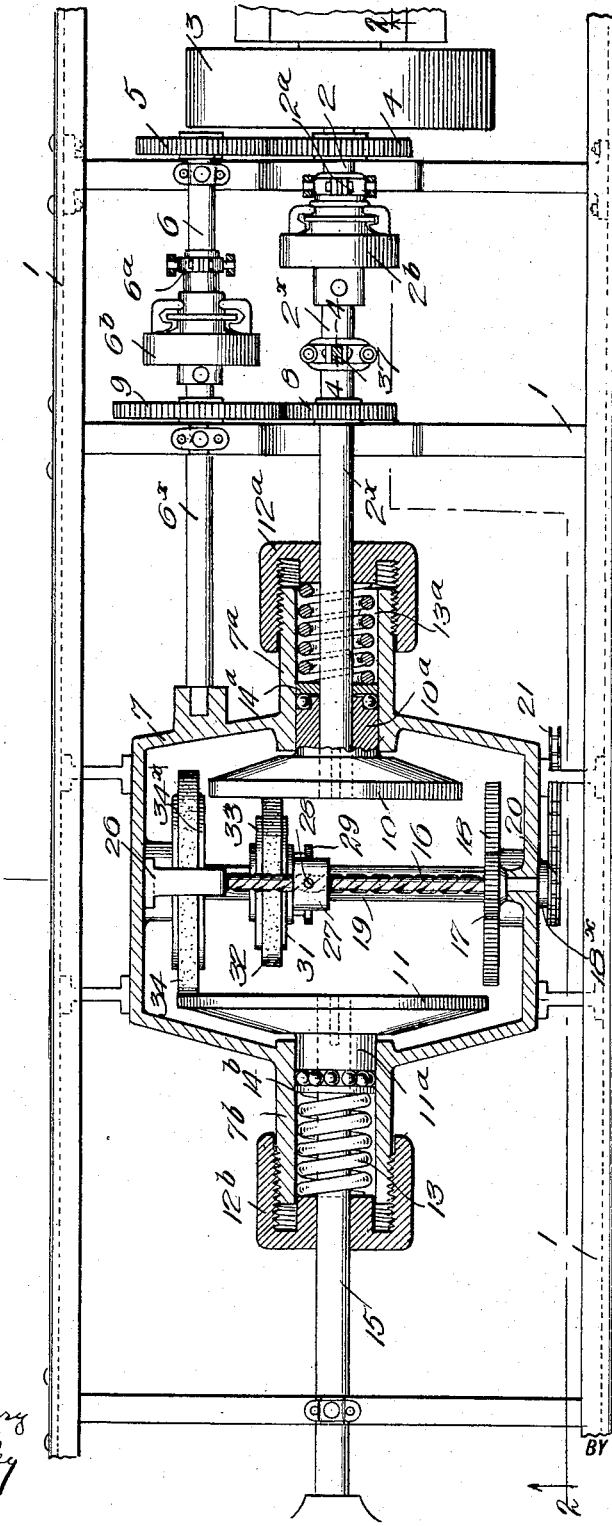

UNITED STATES PATENT OFFICE.

CHARLES SIDNEY ALLEN, OF FORT GAINES, GEORGIA, ASSIGNOR TO ALLEN TRANSMISSION COMPANY, OF SAN FRANCISCO, CALIFORNIA, A CORPORATION OF CALIFORNIA.

DIRECT-DRIVE FRICTION TRANSMISSION.

1,177,468.

Specification of Letters Patent. Patented Mar. 28, 1916.

Application filed March 9, 1915. Serial No. 13,224.

*To all whom it may concern:*

Be it known that I, CHARLES S. ALLEN, a citizen of the United States, and a resident of Fort Gaines, in the county of Clay and State of Georgia, have made certain new and useful Improvements in Direct-Drive Friction Transmission, of which the following is a specification.

My invention relates to improvements in transmission mechanisms, and it consists in the combinations, constructions and arrangements of parts herein described and claimed.

An object of my invention is to provide a device of the type described having few parts, and these of a simple nature, therefore eliminating troubles due to a multiplicity of complex elements.

A further object of my invention is to provide a transmission mechanism whose use will insure the longer life of all the parts of the car, such as engines, chassis and tires, due to the fact that jerks and jars such as that caused by changing gears, is entirely eliminated.

A further object of my invention is to provide a system of clutches by means of which the car is under absolute control at all times, and in which the transmission will give any speed from a minimum to a maximum or forward or reverse when the engine runs at normal speed.

Other objects and advantages will appear in the following specification, and the novel features will be particularly pointed out in the appended claims.

My invention is illustrated in the accompanying drawings forming a part of this application, in which—

Figure 1 is a plan view of the transmission mechanism, certain parts being shown in section. Fig. 2 is a side view of the transmission mechanism. Fig. 3 is a section along the lines 3—3 of Fig. 1, Fig. 4 is a section on the line 4—4 of Fig. 1, and Fig. 5 is a perspective view showing a portion of the speed changing mechanism.

In carrying out my invention I make use of a chassis frame portion such as that shown at 1 in Figs. 1 and 2. Upon this frame is mounted in suitable bearings, a main drive shaft 2, upon which is mounted the fly wheel 3 of the engine. A gear 4 on the shaft 2 meshes with a gear 5 on the auxiliary shaft 6, which is parallel with the shaft 2.

The shaft 2 is provided with a frictional clutch member $2^a$, which is arranged to engage a frictional clutch member $2^b$ on an auxiliary shaft $2^x$, which is in alinement with the shaft 2. The shaft 6 is provided with similar clutch members $6^a$ and $6^b$, the latter being on the end of a shaft $6^x$, which is journaled in the casing 7, as shown in Fig. 1. A gear 8 on the shaft $2^x$ meshes with a gear 9 on the shaft $6^x$.

Disposed between the side members of the chassis is the friction disk casing 7. This is provided with a pair of alined cylindrical extensions $7^a$ and $7^b$ at opposite ends of the casing as is clearly shown in Figs. 1 and 2. These extensions form in fact cylindrical bearings for the hubs $10^a$ and $11^a$ respectively of the friction wheels 10 and 11.

In order to reduce friction, ball bearings are provided as shown. Each of the cylindrical extensions $7^a$ and $7^b$ is provided with a screw cap such as those shown at $12^a$ and $12^b$ respectively, while springs $13^a$ and 13 are interposed between the inner ends of the screw caps and plates $14^a$ and $14^b$, which form part of the ball bearings of the friction disks 10 and 11 respectively. Friction disk 11 is mounted on the end of a shaft 15 which constitutes the final drive and is designed to connect with the differential of the rear axle (not shown).

Disposed at right angles to the shafts $2^x$ and 15 is a screw shaft 16, one end of which is journaled in the walls of the casing, and which is provided at one end with a gear 17, arranged to mesh with a gear 18 mounted at one end of a sleeve $18^x$ journaled in the wall of the casing which is loosely mounted on a shaft 19, the latter extending parallel with the screw shaft 16 and being also journaled in the opposite wall of the casing, as shown in Fig. 3. The sleeve $18^x$ is extended beyond the casing and is provided with a sprocket wheel 20, which is arranged to be driven by a sprocket chain 21, which passes over a sprocket 22 on the stub shaft 23, carried by the body 24 of the vehicle. A lever 25 is disposed in convenient position to the operator of the vehicle and is secured to the sprocket 22 for the purpose of securing the latter.

As will be seen from Fig. 3, the opposite end of the screw shaft 16 is journaled in a bracket 26 secured to the walls of the casing 7. This shaft passes through a collar 27 which is provided with a pin 28 arranged to enter the threads of the screw. The collar 27 is provided with a yoke 29, which straddles a grooved hub 30 of a clamping member 31. A friction disk 32 is held between the clamping member 31 on one side and a similar clamping member 33 on the other. The hub 30 is provided with a key or feather 30$^a$ arranged to slide in the slot 19$^a$ in the shaft 19 (see Fig. 5). The shaft 19 is also provided with a friction disk 34, which is held between clamping members 34$^x$.

Three foot levers are mounted in front of the operator for operating the device. One of these foot levers 35 is connected by a link 36 to a lever 37 which is pivoted at 38 (see Fig. 2), and which connects with a ring 39 disposed between collars 40 and secured to the shaft 2$^x$. The foot lever is for the purpose of moving the shaft 2$^x$ so as to shift the friction disk 10 out of engagement with the friction disk 32. The foot lever 41 is pivoted at 42 for operating the clutch member 2$^a$, while the foot lever 43 is pivoted at 44 for operating the clutch member 6$^a$.

From the foregoing description of the various parts of the device, the operation thereof may be readily understood.

Consider the parts in the position shown in Fig. 1 with the clutch members 6$^a$ and 6$^b$ released so as to prevent transmission of power from the shaft 6 to the shaft 6$^x$, and the clutch members 2$^a$ and 2$^b$ brought into engagement. Power will now be transmitted from the shaft 2 to the shaft 2$^x$, thence by means of the disk 10 to the disk 32, thence to the shaft 19 to the disk 34 and by means of the disk 11 to the final drive shaft 15. This will give a motion to the shaft 15 in the opposite direction from that of the main engine shaft 2. Now, if the driver wishes to drive the final drive shaft 15 in the same direction as the driving shaft 2, he shifts the lever so as to cause the rotation of the screw shaft through the medium of sprocket 22, sprocket chain 21, sprocket 20, sleeve 18$^x$, gear 18, and gear 17. Rotation of the screw shaft 16 causes the driving disk 32 to be moved toward and away from the center of the disk 10 in accordance with the direction of movement of the lever 25. The driving disk 32 may be moved to the opposite side of the center of the disk 10 when the shaft 15 will now be driven in the same direction as the shaft 2. Moreover, the shifting of the driving disk 32 toward and away from the center of the disk 10 will produce different speeds of rotation of the shaft 19. When the disk 32 is at the outer edge of the disk 10, the speed will be greatest, and when it is moved toward the center, it will gradually become less.

When the shafts 2 and 2$^x$ are disconnected and the shafts 6 and 6$^x$ are connected, then the shaft 2$^x$ is driven at a greater speed, owing to the arrangement of the gears 4, 5, 9 and 8.

The tension of the disks 10 and 11 on their respective disks 32 and 34 may be regulated by screwing up the caps 12$^a$. In an arrangement of this kind it will be seen that one may obtain any speed from a maximum to a minimum, forward or reverse. The device is practically noiseless and there is no liability of injuring the mechanism as would occur if gears were used, through the stripping of the gears. The device may be used as a safety or emergency brake which is effective in bringing the car to a stop quickly, but without jerking the car, and without the danger of racking the same and loosening the parts.

I claim:

1. In a transmission mechanism, a casing having a pair of alined cylindrical extensions, a pair of friction disks having hubs journaled in said alined extensions, a transverse shaft rotatably mounted in the casing between said friction disks, a friction wheel on said shaft normally in engagement with one of said disks, a second friction wheel on said shaft normally in engagement with the other of said friction disks, springs for pressing said friction disks upon said wheels, and means for adjusting the tension of the springs, said last named means comprising screw caps carried by said extension and arranged to bear against said springs.

2. In a transmission mechanism, a casing having a pair of alined hollow cylindrical extensions, a pair of friction disks having hubs journaled in said alined extensions, each of said extensions being threaded at its outer end, screw caps arranged to engage the outer threaded ends of said extensions, a shaft secured to the hub of each disk and arranged to extend through the opening in its associated screw cap, a transverse shaft rotatably mounted in the casing between said friction disks, a friction wheel on said shaft normally in engagement with one of said disks, a friction wheel on said shaft normally in engagement with the other of said friction disks, and means for moving one of said friction wheels toward and away from the center of its associated friction disk.

3. In a transmission mechanism, a casing having a pair of alined hollow cylindrical extensions, a pair of friction disks having hubs journaled in said alined extensions, each of said extensions being threaded at its outer end, screw caps arranged to engage the outer threaded ends of said extensions, a shaft secured to the hub of each disk and arranged to extend through the opening in its associated screw cap, a spiral spring disposed in each of said hollow extensions, said spiral spring surrounding its associated shaft, a bearing at one end on said screw cap, a transverse shaft rotatably mounted in the casing between said friction disks, a friction wheel on said shaft normally in engagement with one of said disks, a friction wheel on said shaft normally in engagement with the other of said friction disks, and means for moving one of said friction wheels toward and away from the center of its associated friction disks.

4. In a transmission mechanism, a casing having a pair of alined hollow cylindrical extensions, a pair of friction disks having hubs journaled in said alined extensions, each of said extensions being threaded at its outer end, screw caps arranged to engage the outer threaded ends of said extensions, a shaft secured to the hub of each disk and arranged to extend through the opening in its associated screw cap, a spiral spring disposed in each of said hollow extensions, said spiral spring surrounding its associated shaft and bearing at one end on said screw cap, a plate slidably disposed on each of said shafts and arranged to be engaged by the opposite end of the spring, anti-friction members disposed between said last named plate and the hubs of the disks, a transverse shaft rotatably mounted in the casing between said friction disks, a friction wheel on said shaft normally in engagement with one of said disks, a friction wheel on said shaft normally in engagement with the other of said friction disks, and means for moving one of said friction wheels toward and away from the center of its associated friction disk.

5. In a transmission mechanism, a casing, a pair of friction disks rotatably mounted therein, a shaft disposed between said friction disks, a friction wheel carried by the shaft and arranged to bear on the face of one of said disks, a second friction wheel carried by the shaft and normally arranged to bear on the face of the other disk, a collar secured to said second named wheel, a screw shaft arranged to pass through the collar, a pin carried by the collar and extending into the threads on the screw shaft whereby when the screw shaft is turned the friction wheel bearing the collar is moved along its shaft, said screw shaft being of a length to permit the movement of said friction wheel past the center of its associated friction disk, thereby permitting a reverse movement, and means for rotating the screw shaft independently of the friction wheel shaft.

CHARLES SIDNEY ALLEN.

Witnesses:
JOHN B. CLAYTON,
FRANCES B. MCDERMOTT.

Copies of this patent may be obtained for five cents each, by addressing the "Commissioner of Patents. Washington, D. C."